2 Sheets—Sheet 1.

W. P. PENN.

SEEDING-MACHINE.

No. 6,726. Reissued Nov. 2, 1875.

Witnesses:
Henry Kutchler

Inventor:
Worden P. Penn

N. PETERS, PHOTO-LITHOGRAPHER, WASHINGTON, D. C.

2 Sheets—Sheet 2.

W. P. PENN.

SEEDING-MACHINE.

No. 6,726. Reissued Nov. 2, 1875.

Witnesses:
Henry Reutchler

Morden P. Penn Inventor:

N. PETERS, PHOTO-LITHOGRAPHER, WASHINGTON, D. C.

UNITED STATES PATENT OFFICE.

WORDEN P. PENN, OF BELLEVILLE, ILLINOIS, ASSIGNOR OF ONE-HALF INTEREST TO HENRY RENTCHLER, OF SAME PLACE.

IMPROVEMENT IN SEEDING-MACHINES.

Specification forming part of Letters Patent No. 59,639, dated November 13, 1866; reissue No. 6,726, dated November 2, 1875; application filed May 10, 1875.

*To all whom it may concern:*

Be it known that I, WORDEN P. PENN, of Belleville, St. Clair county, State of Illinois, have invented Improvements in Seeding-Machines. The following is a full, clear, and exact description thereof, reference being had to the accompanying drawings, making a part of this specification, in which—

Figure 4:
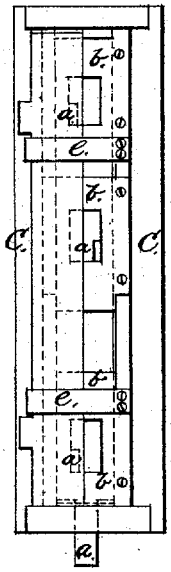
Figure 2:
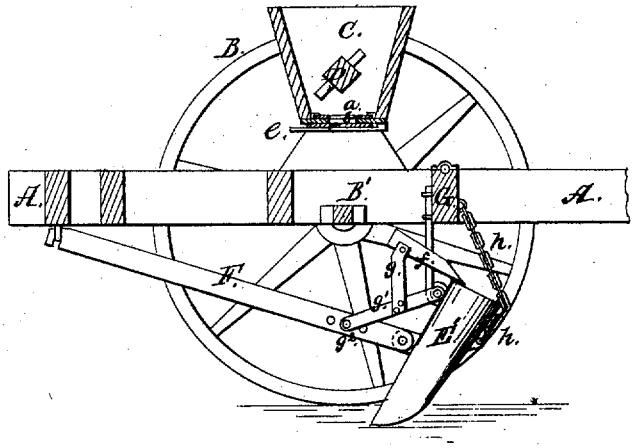
Figure 1:
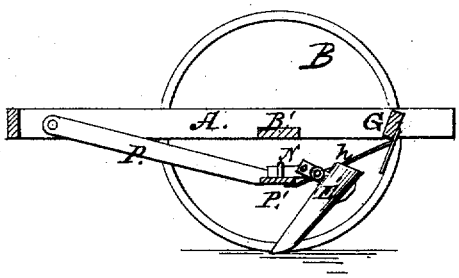
Figure 5:
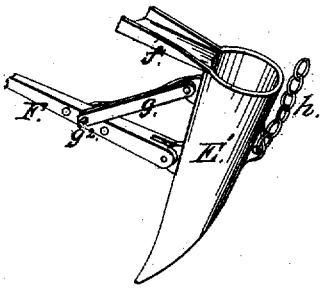
Figure 3:
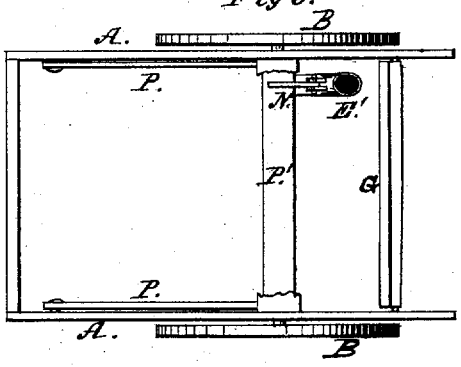
Figure 6:
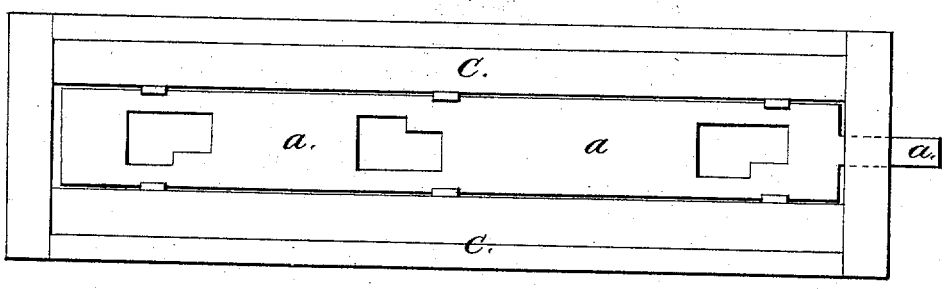
Figure 7:
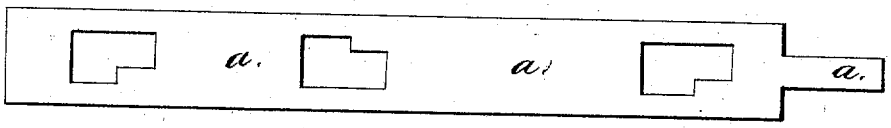
Figure 8:
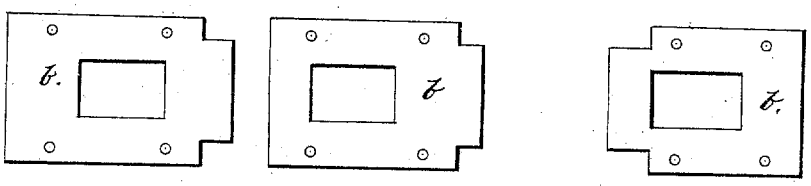
Figure 9:
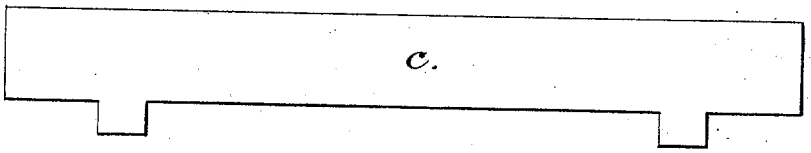

Figure 1 is a longitudinal section of the frame of a seeding-machine having my improvements applied to it. Fig. 2 is a longitudinal section of a seeding-machine, showing a modification in construction. Fig. 3 is a top view of Fig. 1. Fig. 4 is a bottom view of the hopper, showing the adjustable seed-discharging slides. Fig. 5 is a perspective view of a tooth attached to a drag-bar. Fig. 6 is a top view of the hopper. Fig. 7 is a top view of the seed-plate *a*. Fig. 8 shows a top view of the several plates *b*—one for each seed-outlet.

Similar letters of reference indicate corresponding parts in the several figures.

My improvement relates mainly to a novel method of applying the teeth of seeding-machines to a swinging transverse beam by means of bars, as hereinafter described.

To enable others skilled in the art to make and use my invention, I will describe its construction and operation.

In the accompanying drawings, A represents the frame of the machine, which may be constructed in any suitable manner, and which is mounted upon transporting-wheels B B. Upon this frame A, and extending transversely across it near the axle-tree B′, is a hopper, C, which is to contain the seed for distribution. The bottom of this hopper is composed of several plates, *a b c*. (Shown in Figs. 2 and 4.) The plate *a* which is nearest the seed in the hopper, or which is the uppermost plate, is perforated at suitable intervals along its length, which perforations are oblong, but somewhat in the form of the letter L—*i. e.*, one portion of the width of each opening is greater than that of another portion, as shown in Fig. 4. Plate *a* is longitudinally adjustable with respect to the hopper, and may be adjusted by a screw or otherwise. Beneath the plate *a* are several plates, *b*, having rectangular oblong openings through them, as shown in Fig. 4, and beneath these stationary plates *b b b* is a sliding plate, *c*, also shown in Fig. 4, which is supported by the straps *e e*, and which is of sufficient length to close the openings through the bottom of the seed box or hopper C, when this plate is moved back or forward, as the case may be, beneath said openings. The slide *c* serves the purpose of a cut-off for said openings, and it may be adjusted in any convenient manner.

By means of the above-described combination of fixed and movable plates, constructed as shown, and applied to the bottom of a seed-box, C, I obtain a small square or rectangular opening, or an oblong opening, with one part of such opening wider than the other part, and by this means the width, as well as the length, of the openings of the plate *a* is varied according to the size of the seed or the flow required. The holes of plate *a* are disposed or arranged so that the decreasing offsets of the holes alternately come on opposite sides of the vertical axis of the hopper. The arrangement of the plates and form of the holes therein enable me to exercise control over the discharging-mechanism for the seed, and to effect a rapid or slow flow of the seed, as circumstances require.

The agitator D consists of a shaft which extends through the hopper C in a direction with its length, and which is provided with a number of projecting pins for stirring the seed in said hopper, and causing them to flow through the discharge-openings. This agitator D may be rotated or oscillated by gearing communicating with the transporting-wheels. The arrangement of the spurs or pins in said agitator D may vary according to the motion which is given to it. After leaving the hopper C, the seed is conducted into a trough or chute, *f*, which is formed on or rigidly applied to the upper end of the tooth E′. In practice, a number of such teeth will be employed, corresponding to the number of discharge-openings in the bottom of the hopper.

In Figs. 1 and 3 I have represented a tooth, E′, connected to a short bar, N, which is pivoted at its forward end, in any suitable manner, to a swinging transverse beam, P′. This swinging transverse beam P′ is connected to the frame, forward of the axle-tree B′, by means of arms P P, which are pivoted at their forward ends to the longitudinal beams of the frame A, in such a manner that the transverse beam P′ can rise and fall and allow the tooth E′ to accommodate itself to inequalities on the surface of the ground passed over. This swinging transverse beam P′ is connected by chains or straps *h* to a rocking beam, G, which is constructed and applied to frame A, in the manner described hereinafter.

By the employment of a swinging beam, P′, connected by arms P with frame A, and attaching the teeth to said swinging transverse beam P′ by the bars N, a considerable amount of iron is saved in the construction of a seeding machine, and still all the teeth can have independent action, by means of their pivotal connections, with the swinging transverse beam P′, so that one tooth can rise and pass over irregularities of the ground without lifting the others out of working position. All of the teeth have their support upon the swinging transverse beam P′, by means of bars N pivoted to said beam, and, consequently, when beam P′ is elevated or depressed the teeth will receive a corresponding movement.

The chute *f* may be supported at or near its forward end by means of a standard, *g*, secured to a brace, $g^1$, connecting the upper end of the tooth E′ to the drag-bar F, as shown in Figs. 2 and 5. At an intermediate point between the ends of the tooth E′, the rear end of the drag-bar F may be pivoted to this tooth. The diagonal brace *g* may be arranged above the drag-bar, and pivoted both to this bar and to the tooth, so as to constitute an upper brace, and also a support for the forward or upper end of the chute *f*. Holes may be made through the drag-bar F, near the forward end of the brace $g^1$, for the purpose of enabling one to adjust the tooth and set it at different angles. If desirable, a wooden pin, $g^2$, may be used, which will break, and prevent the tooth or its appendages from being injured should the point of this tooth meet with any great obstruction in its path.

The drag-bar *f* may be pivoted to the forward cross-beam of frame A, so that the tooth may rise or fall and accommodate itself to an uneven surface as the machine is moved along, and also so that the tooth may be elevated free from the ground whenever it is desired. The rocking beam G, which extends transversely across the frame A, in the rear of the hopper C, is attached to the teeth E′ by means of chains or straps *h*, and when this beam is moved upward it will elevate the teeth. A handle or lever or other contrivance may be applied to said beam, for the purpose of enabling the attendant to move it and retain it in the desired position. The teeth E′ may be constructed with open bottoms, in the usual manner of making teeth for seeding-machines, and they may be made of thin metal, fashioned in the tubular form represented in Figs. 2 and 4, or they may be made of cast metal.

Having thus described my invention, what I claim as new, and desire to secure by Letters Patent, is—

1. The swinging transverse beam P′, with the bars N thereto attached, in combination with the frame A and arms P P, substantially as specified, for the purpose of carrying the forward ends of the bars N, as specified.

2. The combination of the pivoted arms P P, frame A, and swinging transverse beam P′, with the bars N pivoted thereto, substantially as specified, for the purpose of allowing the hoes to adjust separately, as specified.

3. The combination of the swinging transverse beam P′ with the bars N pivoted thereto, beam G, lever, and lifting-chains, substantially as described, for the purpose stated.

WORDEN P. PENN.

Witnesses:
HENRY RENTCHLER,
PETER JOFFREY,
JULIUS K. WILDING.